Aug. 17, 1937.  G. K. BAINBRIDGE  2,090,095
CANDY CUTTING MACHINE
Filed Sept. 22, 1936
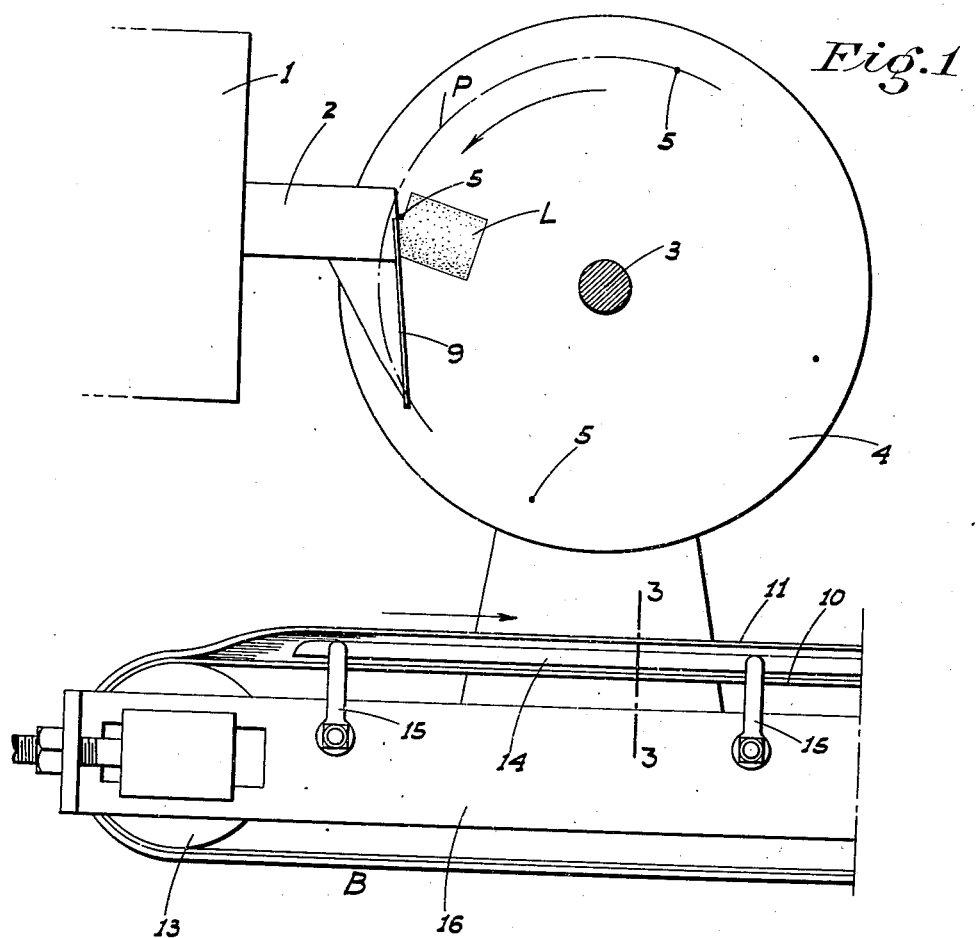
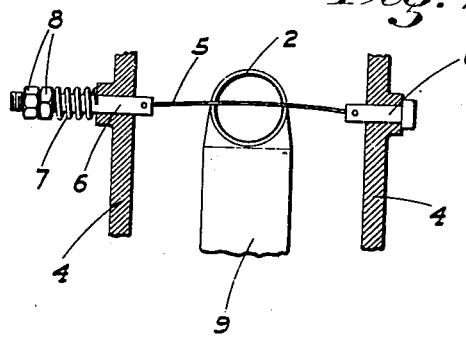
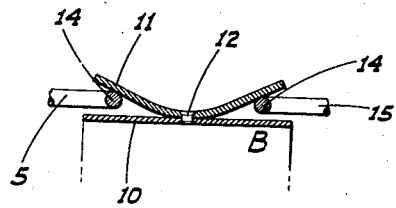
INVENTOR
G. K. Bainbridge
BY
ATTORNEY Patented Aug. 17, 1937

2,090,095

UNITED STATES PATENT OFFICE 2,090,095

CANDY CUTTING MACHINE

George K. Bainbridge, Ripon, Calif.

Application September 22, 1936, Serial No. 101,954

3 Claims. (Cl. 107—20)

The invention relates to devices for cutting plastic candy material (such as cream centers for chocolates) in measured quantities from the spout of the press and particularly represents improvements over the structure shown in my Patent No. 1,303,151 dated May 6, 1919.

As stated in said patent the aim of the structure therein shown was to improve over devices then existing, by the provision of a means to cause each lump of material as cut off from the spout to drop onto the conveyor belt below in the same spaced relation to the preceding lumps. I have since found out however that this desired end was not consistently attained. This was on account of the fact that the cutting wire as it was suddenly released at the bottom of the spout after being tensioned and deflected during its engagement with the spout, tended to catch and "flip" or spin the cut lumps as the latter dropped, thus interrupting their direct drop and causing them to occupy varying positions on the belt.

One object of the present invention therefore is to eliminate this objectionable feature by preventing such sudden release of the cutting wire, and causing it to re-assume its normal position and tension gradually.

I also found that certain kinds of candy material, such as those containing pieces of nut or other relatively hard matter, were apt when cut to be deflected laterally to one side or the other of the spout as they dropped, if such relatively hard pieces were at one side or the other of the lumps. The lumps when deposited on the belt, even if properly spaced along the same, were thus not always in a central position on the belt as is desirable for the subsequent processing of the lumps.

Another object of this invention therefore is to arrange the belt so that the lumps, even if they do not initially engage the belt centrally, will be immediately caused to assume the desired central position on the belt.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a fragmentary side view somewhat diagrammatic, of a candy cutting machine showing my improved features of construction.

Figure 2 is an end view of the spout showing the cutting wire engaging the same, and the mounting of the latter in its supporting discs.

Figure 3 is a fragmentary cross section on the line 3—3 of Fig. 1.

Referring now more particularly to the characters of reference on the drawing, 1 indicates the body of a press, having a horizontal discharge spout 2. Mounted a predetermined distance in front of the spout and on a level slightly below the bottom thereof is a transverse driven shaft, on which is fixed a pair of spaced discs 4. Cutting wires 5, evenly spaced about the discs extend therebetween, each wire being supported at its ends by suitable means such as pins 6 mounted in the discs. One pin is slidable in its disc and has a compression spring 7 and tension adjustment nuts 8 thereon, so as to maintain the wire under a certain normal and adjustable tension. The discs are driven so as to move the wire closest to the spout downwardly past the same.

The outer end of the spout is cut relative to the normal path of rotation of the cutting wires, as in the previous patent, so that if wire engages the spout adjacent the top without any distortion or increase of tension, but so that the wire becomes increasingly tensioned and deflected or distorted radially toward the shaft 3 as the wire moves across the spout to the bottom of the same.

This is the same general arrangement as shown in the previous structure, in which however the wire was then suddenly released. The wire when thus engaged with the spout is however also deflected in the circumferential plane of its movement, on account of the drag of the wire against the material and the spout as shown in Fig. 2. The sudden release of this drag in addition to the sudden release in the radial direction, caused the lumps L as they were cut off and then dropping, to be sometimes caught by the released wire, with the undesired result mentioned in the preamble.

I therefore avoid this sudden release, while keeping the wire at the desired tension for the duration of its passage across the spout, by the provision of a lip 9 which is mounted in rigid connection with the outer end of the spout flush therewith and depending therefrom, and parallel to the cutting wires. This lip is disposed at such an angle relative to the normal path P of movement of the wire, and is of such a length that its lower end is outside said path. In this manner the distortion of the wire is gradually instead of suddenly decreased, and by the time the wire reaches the bottom of the lip it has reassumed its normal position and tension without any noticeable or violent movement such as would tend to cause interference with the lump dropping from the spout.

It is also my aim to cause the lumps as they fall to occupy a central position on the conveyor belt B, irrespective of any lateral deviation of the lumps as they fall. This belt extends lengthwise of the spout and is transversely symmetrical thereto. Its upper run, for the portion thereof directly under and adjacent the spout, is made concave on its upper surface as shown. This concavity is sufficient to cause the lumps, contacting said belt to one side or the other of the center, to be deflected to the center.

This concave form of the belt may be provided in any suitable manner. In the present instance I have shown the belt as being constructed of separate inner and outer layers of material 10 and 11 respectively, connected together only along the center by suitable means such as indicated at 12. Both layers lie flatly together when they pass about their end rollers 13 so that the latter may be of ordinary cylindrical form. Where the concave form of the outer layer 11 is desired, I place rods 14 or the like between the belt layers. These rods extend lengthwise of the belt outwardly and on opposite sides of the central connection 12 and are located at such a height relative to the inner layer 10 as to cause the portions of the upper belt layer, riding on the rods, to assume a transverse upward slope, thus giving the belt the desired concave form in cross section as shown in Fig. 3. The rods are of course suitably mounted against movement which may be accomplished by means of arms 15 projecting from the rods and secured to the side frames 16 of the conveyor.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In combination with the substantially horizontal outlet spout of a candy-material press, a tensioned transverse cutting wire, means mounting the wire for downward movement in a definite path against the end of the spout, said end being cut relative to the path of the wire so that as the latter descends in contact with the spout it will be deflected and its tension increased, and means acting on the wire after it reaches the bottom of the spout to cause the wire to gradually reassume its normal tension and to reach such tension only after a predetermined extent of movement of the wire below the spout.

2. A structure as in claim 1 in which such means comprises a lip rigid with and depending from the outer end of the spout flush therewith and parallel to the wire; said lip extending at such a slope relative to the normal path of movement of the wire as to terminate outside said path at a predetermined distance below the spout.

3. In combination with the outlet spout of a plastic-material press, a tensioned cutting wire, means mounting the wire for movement in a definite path across the end of the spout from one side thereof, said end being cut relative to the path of the wire so that as the latter moves across the spout it will be deflected and its tension increased, and means acting on the wire after it leaves the spout to cause said wire to gradually reassume its normal tension with the continued movement of the wire.

GEORGE K. BAINBRIDGE.